United States Patent [19]

Pinard

[11] Patent Number: 5,689,623
[45] Date of Patent: Nov. 18, 1997

[54] SPREAD SPECTRUM DIGITAL SCREENING

[75] Inventor: Adam I. Pinard, Amherst, N.H.

[73] Assignee: Optronics International Corporation, Chelmsford, Mass.

[21] Appl. No.: 410,785

[22] Filed: Mar. 27, 1995

[51] Int. Cl.$^6$ .............................. G06K 15/00; H04N 1/40
[52] U.S. Cl. ...................... 395/106; 395/109; 358/457; 358/465; 358/466; 358/458; 358/456; 358/536
[58] Field of Search ...................... 395/106, 109, 395/101; 358/536, 458, 457, 456, 448, 535, 534, 465, 466; 382/172, 168, 169

[56] References Cited

U.S. PATENT DOCUMENTS

| 4,413,286 | 11/1983 | Boston | 358/283 |
| 4,425,642 | 1/1984 | Moses et al. | 370/76 |
| 4,651,228 | 3/1987 | Koch | 358/298 |

(List continued on next page.)

FOREIGN PATENT DOCUMENTS

| 0 642 258 A2 | 3/1995 | European Pat. Off. . | |
| 642258 | 3/1995 | European Pat. Off. | H04N 1/405 |
| WO 92/10905 | 6/1992 | WIPO . | |

OTHER PUBLICATIONS

"Power Spectrum Shaping of Halftone Patterns and Its Effect on Visual Appearance", 1992 IEEE International Conference on Acoustics, Speech and Signal Processing, 23–26 Mar. 1992.
"Turning Blue Sound Into Blue Noise", 1992 IEEE Internal Conference on Acoustics, Speech and Signal Processing, 23–26 Mar. 1992.
"Electronically Generated Halftone Pictures", R. J. Klensch et al., RCA Review, vol. 31, No. 3, Sep. 1980.
"Digital Electronics Meets Its Match", Anastasios P. Goutzoulis et al., IEEE Spectrum, Aug. 1988.
"Principles of Color Reproduction", J.A.C. Yule, 1967.
"Fourier Spectrum of Halftone Images", D. Kermisch et al., Journal of the Optical Society of America, vol. 65, Jun. 1975.
"Halftone Method with Edge Enhancement and Moire Suppression", Paul G. Roetling, Journal of the Optical Society of America, vol. 66, No. 10, Oct. 1976.
"Seybold Seminars '93: A Quick Overview from the High End", The Seybold Report on Publishing Systems, vol. 22, No. 15.
"Halftoning with Random Correlated Noise", Robert J. Rolleston, et al., Journal of Electronic Imaging, 1(2), 209–217 (Apr., 1992).
"Dithering with Blue Noise", Robert A. Ulichney, IEEE, vol. 76, No. 1, Jan. 1988.
ICASSP–92, 1992 IEEE International Conf. on Acoustics, Speech and Signal Processing. vol. 3, pp. 193–196, T. Mitsa et al.: "Power–spectrum shaping of halftone patterns and its effect on visual appearance".

Primary Examiner—Dwayne Bost
Assistant Examiner—Tracy M. Legree
Attorney, Agent, or Firm—Bromberg & Sunstein

[57] ABSTRACT

A spread spectrum digital screening mask and a method and system for digital screening a continuous tone image with the spread spectrum digital screening mask. The mask is characterized in the frequency domain by a function in magnitude independent of angle within a band of frequencies between a minimum frequency and a maximum frequency. The mask may be further characterized by its thresholded binary planes at each of a plurality of predetermined threshold values. The binary planes are characterized in frequency domain by magnitudes primarily distributed within the band of frequencies. For each binary plane, the number of pixels having one of the binary values divided by the total number of pixels in the binary plane equals a fraction determined by the predetermined threshold value of the binary plane divided by the maximum threshold value.

19 Claims, 6 Drawing Sheets

U.S. PATENT DOCUMENTS

| | | | |
|---|---|---|---|
| 4,692,879 | 9/1987 | Ikuta | 364/518 |
| 4,698,691 | 10/1987 | Suzuki et al. | 358/283 |
| 4,736,254 | 4/1988 | Kotera et al. | 358/283 |
| 4,800,442 | 1/1989 | Riseman et al. | 358/280 |
| 4,800,443 | 1/1989 | Crinon et al. | 338/280 |
| 4,819,075 | 4/1989 | Imaide et al. | 358/213 |
| 4,821,109 | 4/1989 | Roe | 358/253 |
| 4,825,298 | 4/1989 | Ikuta et al. | 358/298 |
| 4,912,569 | 3/1990 | Petilli | 358/465 |
| 4,920,501 | 4/1990 | Sullivan et al. | 364/518 |
| 4,941,185 | 7/1990 | Reed | 382/41 |
| 5,070,413 | 12/1991 | Sullivan et al. | 358/456 |
| 5,079,721 | 1/1992 | Gershony | 395/132 |
| 5,111,310 | 5/1992 | Parker et al. | 358/456 |
| 5,150,225 | 9/1992 | Kreitman | 358/456 |
| 5,198,910 | 3/1993 | Ng et al. | 358/456 |
| 5,214,517 | 5/1993 | Sullivan et al. | 358/456 |
| 5,220,432 | 6/1993 | Roe et al. | 358/298 |
| 5,274,473 | 12/1993 | Kidd et al. | 358/458 |
| 5,283,140 | 2/1994 | Netz et al. | 430/6 |
| 5,309,526 | 5/1994 | Pappas et al. | 382/56 |
| 5,315,409 | 5/1994 | Matsumura et al. | 358/458 |
| 5,323,247 | 6/1994 | Parker et al. | 358/456 |
| 5,467,196 | 11/1995 | Fukushima et al. | 358/458 |

SPREAD SPECTRUM DIGITAL SCREENING

BACKGROUND OF THE INVENTION

The present invention relates to image reproduction, and more particularly, to the use of a halftone screen to produce a binary image.

Digital screening typically involves scanning a continuous tone image and converting the image into digital image data. For each pixel in the scanned continuous tone image, a digital value is determined representative of the color of the pixel. The digital value may be converted to optical density values corresponding to the tone for each of a plurality of base colors. Typically, the digital image data is converted into four optical density values representing cyan, yellow, magenta and black. While theoretically three primary colors are sufficient, it has been found difficult to print all three colors to achieve proper grays. Therefore the fourth base color, black, is used. Additional colors may be added, if desired.

A screened image is produced for each of the base colors used in the printing process for a color image. For a single color image such as a gray scale image, only a single screened image is retired. For each screened image, the optical density values collected by scanning are thresholded against a collection of data representing a screen to produce a digital output representative of the screened image. The screen is a stored array of optical density value thresholds. Each storage address in the array corresponds to a specific location within the screen. A screen can be made large enough to cover any image simply by continuous repetitions of the stored screen.

Figure 1:
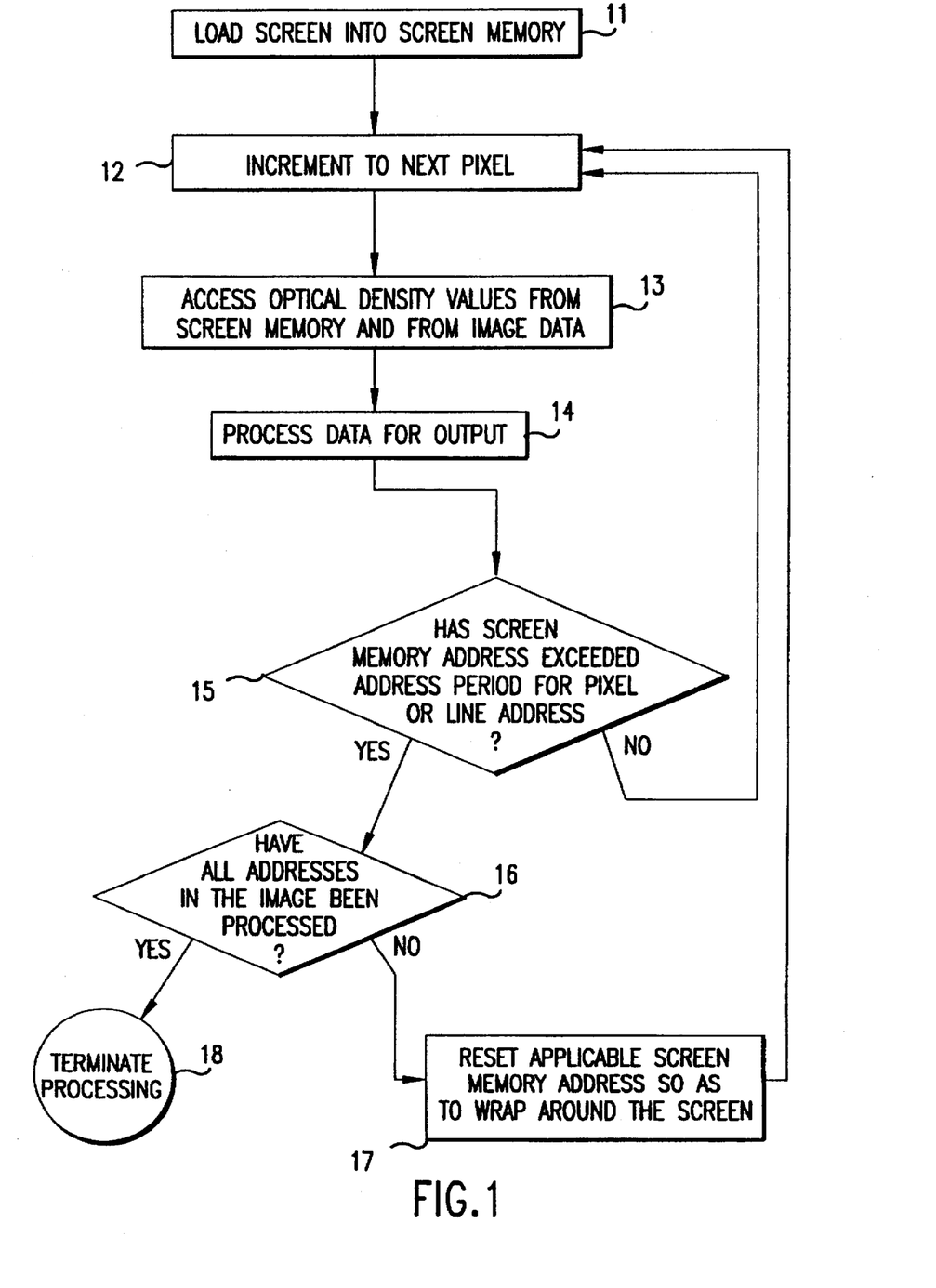
FIG. 1 is a schematic representation of logical flow for a screening process.

In order to reproduce in master form an image that has been subjected to the screen, the logical flow of steps shown in FIG. 1 are performed. The screen array or "tile" is loaded into screen memory as per step 11. A pixel address is selected in accordance with step 12. The selection of pixels is successively incremented so as to cover the entire array of pixels in the image. For the given pixel location, the optical density values are accessed in step 13 from the image data and from the screen memory. The densities are processed in step 14 in accordance with the prior art, as for example, comparing them and generating a binary signal. In the case of halftones, if the image value is greater than the screen value, the output value is typically set to a maximum or black pixel. If the image value is less than the screen value, the output value then would typically be set to a minimum or white pixel. When a screen memory address has exceeded the address period of a row or column, the program resets the screen memory address so as to wrap around from one edge to the opposite edge of the screen. The process continues until the entire image being screened has been compared pixel-by-pixel with a screen threshold value. This approach to screening can be very fast, because virtually all calculations are performed in advance of screening. The limiting factors for speed are in accessing the data and performing the comparison.

A conventional digital screen is generally formed by a repeating pattern of fixed size clusters of pixels at fixed spacing. In color screening, the screen used for each of the basic colors is angled with respect to each other so that they do not superimpose a Moire pattern.

More recently, stochastic screening has been implemented. A typical stochastic screen may include fixed size dot clusters that are variably spaced and located. Alternatively, the stochastic screen may provide variably spaced and variably sized dot clusters. Rolleston and Cohen in their article Rolleston et al., "Halftoning With Random Correlated Noise", *Journal of Electronic Imaging*, 1(2), 209–217, April 1992, disclose a method for generating a halftone screen that satisfies certain constraints in the frequency domain of the mask and histogram equalization of the mask. Parker et al. in U.S. Pat. No. 5,111,310, disclose a screen representative of a blue noise power spectrum. The principal frequency of the blue noise mask is given by Parker as the square root of the distance between addressable points on the display. At the principal frequency, the power spectrum reaches its maximum value at a gray level of one-half since at that level, the populations of black and white dots are equal and thus very high frequency components appear in the binary image.

SUMMARY OF THE INVENTION

The present invention is directed to the use of a spread spectrum screening mask. The mask is characterized by an array of optical density threshold values which in the frequency domain appears as a function in magnitude independent of angle between a minimum and maximum frequency. The minimum frequency is above visible image frequencies and the maximum frequency falls within the ability of a binary printing apparatus. The function followed by the magnitudes in the frequency band may be a step function providing a uniform magnitude across the frequency band.

The two-dimensional array of optical density threshold values may be represented by a plurality of binary planes wherein each binary plane is determined by a comparison between the optical density threshold value of each pixel in the array and one of a plurality of predetermined threshold values. For example, for each color there may be 256 predetermined threshold values between 0 and 255. Each value represents a tone or optical density level for that color. For each binary plane, the number of pixels having one of the two binary values divided by a total number of pixels in the plane approximately equals the fraction determined by taking the predetermined threshold value for that binary plane and dividing it by the maximum threshold value. This provides histogram equalization of the printed media. It is this thresholded binary plane which provides the appropriate optical density for each optical density level. Furthermore, each of the binary planes in the digital screening mask when considered in the frequency domain also exhibits magnitudes according to a function independent of angle between the minimum frequency and the maximum frequency. The spread spectrum screening mask may further be constrained to require pixel clusters such that each pixel in a binary plane is adjacent to at least a given number of similarly valued pixels.

A method of the invention involves reproducing an image by scanning a continuous image to produce a digital representation of the color values of the image. Each pixel in the two dimensional array of scanned tone values is compared with a correspondingly located pixel in the spread spectrum screening mask. A binary value is generated for each comparison in response to whether the scanned image tone value exceeds the screening mask optical density threshold. The resulting binary values result in a halftone image of the original continuous image. For a color image, the digitization of the continuous image is converted into tone value arrays for each of the basic colors to be used in the printing process. The binary values are generated by comparing each of the tone value arrays with an appropriate spread spectrum screening mask. A different screening mask may be used for each color. One method of making each of the masks different is to make them a different size. In other words, rather than a 512×512 pixel array, another color can be made 496×496 pixels.

An apparatus of the invention for digitally screening an image includes a comparator for comparing each pixel in an image array with the spread spectrum screening mask.

In accordance with the present invention, low frequency artifacts are avoided in the halftoned image. Furthermore, all tone information is preserved by avoiding clusters of less than 3 pixels which would otherwise be difficult or impossible to print.

Other objects and advantages of the present invention will become apparent during the following description of the presently preferred embodiments of the present invention taken in conjunction with the drawings.

DETAILED DESCRIPTION OF THE PREFERRED EMBODIMENTS

The digital screening mask of an embodiment of the invention is a two-dimensional array of optical density values. The optical density values are used as thresholds. Each pixel in the two-dimensional array has a single optical density value which acts as the threshold. Upon comparing a pixel of image data with a pixel in the digital screening mask, an image value above the optical density value will generate one binary value while an image value below the optical density value will result in an opposite binary value. The presently preferred embodiment of the screening mask is a rectangular array. More particularly, the screening mask is a 512×512 pixel array. The mask may be repeated contiguously vertically and horizontally so that an entire image may be thresholded against the mask. It is within the skill in the art to make a mask of the invention in other shapes such as hexagonal within the scope of the invention. It is desirable to make the spread spectrum mask as large as the computer hardware can support. A smaller mask will make it more easy to see an undesirable pattern artifact in the halftone image caused by the repetitive use of the mask across an image.

To permit continuous repetition of the spread spectrum mask, without creating visual border effects the opposite edges of the mask match. This produces seamless tiling. The left and right edges of the mask are equal and the top and bottom edges are likewise equal. By creating the spread spectrum mask in the frequency domain with uniformity at every angle, the requirements of a seamless tile are achieved.

In accordance with an embodiment of the invention, the screening mask is a spread spectrum mask characterized in the frequency domain by magnitudes following a function over a band of frequencies independent of angle. The frequency domain for the mask is determined by taking a Fourier transform of the two dimensional array of optical density values. A fast Fourier transform is adequate.

The minimum frequency of the band is a higher spatial frequency than is visible to a person looking at the original continuous tone image from a normal distance. Frequency is measured in terms of dots per inch. The maximum human perception threshold in terms of dots per inch depends on from what distance the image is being viewed. At a distance of six inches, the human perception threshold is approximately 200 dots per inch. At greater distances, the ability to see higher frequencies in an image is reduced and the maximum human perception threshold falls below 200 dots per inch.

The maximum frequency of the band characterizing the screening mask falls below a binary printing apparatus transfer function. The halftone image created using a spread spectrum mask may initially be formed in a film but will ultimately be printed. Halftoning is for use with binary printing apparatus in which the intensity of a pixel cannot be controlled. Each pixel either receives a color or not. Binary printing apparatus include offset printing presses, color copiers, facsimile machines, etc. Ink dots may only get so small before it is impossible for the ink to stick on the substrate, normally paper. Likewise, it is difficult for a printing press to leave a minute pixel size hole surrounded by inked pixels. The relative ability of a printing press to print small dots is given by its printing transfer function. By eliminating high frequencies in the screening mask, the occurrence of stray pixels of one value or the other in the thresholded image can be eliminated or at least reduced.

A countervailing consideration with respect to the frequency limits of the spread spectrum band is that the band needs to be broad in order to avoid appearance of a Moire effect when superimposing halftone images of different basic colors. In particular, when black is one of the basic halftoning colors, a Moire effect can develop between the black image and the other colors. The effect is particularly pronounced if spread spectrum masks with narrow frequency bands are used. The wider band significantly reduces the magnitude of any visible low frequency Moire generated by superimposing a black halftone image on the halftone image of another basic color. A range of between 250 dots per inch and 500 dots per inch has been found to produce visually pleasing results.

Figure 2:
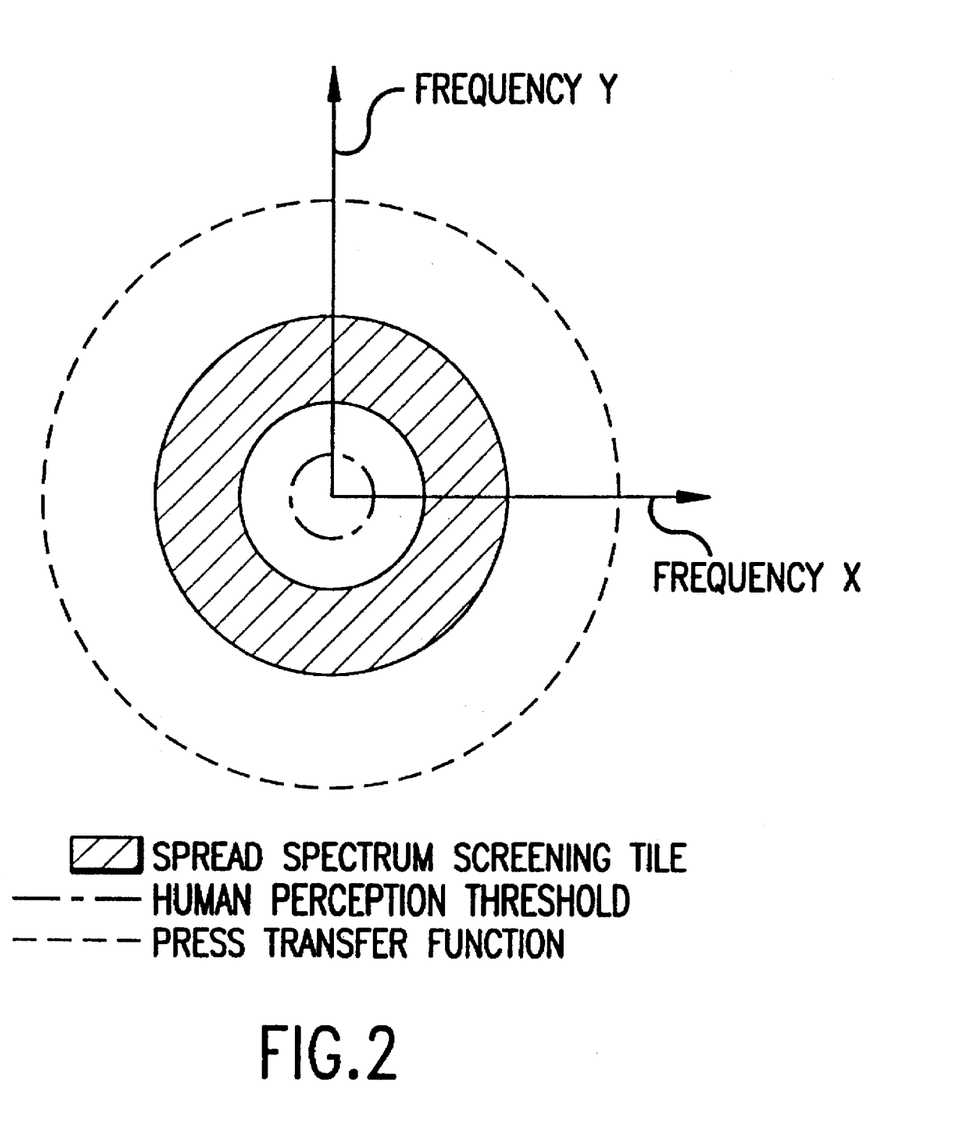
FIG. 2 is a plot in the frequency domain of a spread spectrum mask of an embodiment of the present invention.

In accordance with the presently preferred spread spectrum screening mask, the magnitude in the frequency domain of the screening mask is uniform between 250 and 500 dots per inch as shown in FIG. 2. A uniform magnitude across the band of frequencies is one embodiment of the spread spectrum screening mask, the invention contemplates any magnitude function substantially restricted to within a selected band of frequencies. Thus, one of ordinary skill in the art could form a spread spectrum digital mask replacing the uniform step function with a Gaussian function, a trapezoidal function, a multiple step function or other such function. The magnitude is preferably independent of angle. As such, the magnitude in the frequency domain at a particular frequency is relatively constant over the entire 360°.

Outside the spread spectrum band, the magnitude of the spread spectrum screening mask is preferably relatively insignificant. It is contemplated however that less preferred embodiments may include a tapering off of magnitude that extends beyond a designated spread spectrum band. Another characteristic of the spread spectrum screening mask is viewed in terms of thresholded binary planes viewed at predetermined threshold levels. The optical density values for each pixel in the screening mask will fall within a range between a minimum value and a maximum value. For example, values may range between 0 and 255. Consider the example of a continuous gray tone image. If the screening mask is thresholded against an entirely black area of the image, the image values at all of its pixels may be at one extreme of the optical density threshold, let's say 255. Then if the screening mask were thresholded against an entirely white area of the image, those image values would be all 0. The thresholded binary plane produced by the black tone will have all 1's whereas the thresholded binary plane for the white tone will have all 0's. While the significance of the binary values is easily interchangeable for any system, for the purposes of the present description, the 1's shall represent pixels to be inked and 0's represent pixels to be left without ink. Gray variations between the white and black image can be divided into 254 gradations of gray. An image which has a uniform tone of dark gray that can be measured as being 75% black and 25% white would have an array of optical density values, each set to 191. When this image comprised of pixels all valued at 191 is thresholded against the screening mask, the resulting binary plane should comprise 25% 0's and 75% 1's. The thresholded binary planes at every measurable gradation between white and black should ideally result in a fraction of 1's to total pixels that corresponds with the optical density value of the tonal gradation. Ideally, for each binary plane thresholded at a given optical density value, the number of pixels valued at one divided by the total number of pixels in the binary plane equals a fraction determined by the optical density value being thresholded divided by the maximum optical density value. Approximations to this ideal mapping may within the bounds of unassisted human perception, still produce halftone screened images within the scope of the present invention.

In accordance with an embodiment of the invention, a further constraint may be placed on the spread spectrum screening mask. It is desirable at every optical density value that the thresholded binary plane be forced into having clusters of a given number of similarly-valued pixels. The desired minimum cluster size depends upon the resolution being used in screening. For a 2000 dots per inch resolution, it is presently preferred that all pixels be part of clusters of at least three similarly valued pixels. Thus, in any binary plane, one would not be able to find a 1 surrounded by all 0's. Each 1 or 0 in each of the binary planes at every optical density threshold level is adjacent at least two other similarly-valued pixels. This additional constraint on the thresholded binary planes helps to satisfy the requirements of the printing press where single pixels cannot be printed. This clustering requirement will vary according to the capabilities of the printing press and the size of the screening pixels. If the pixels were made smaller, larger clusters of pixels may be required. For larger pixels, it is possible that the clustering constraint would be superfluous.

Figure 3:
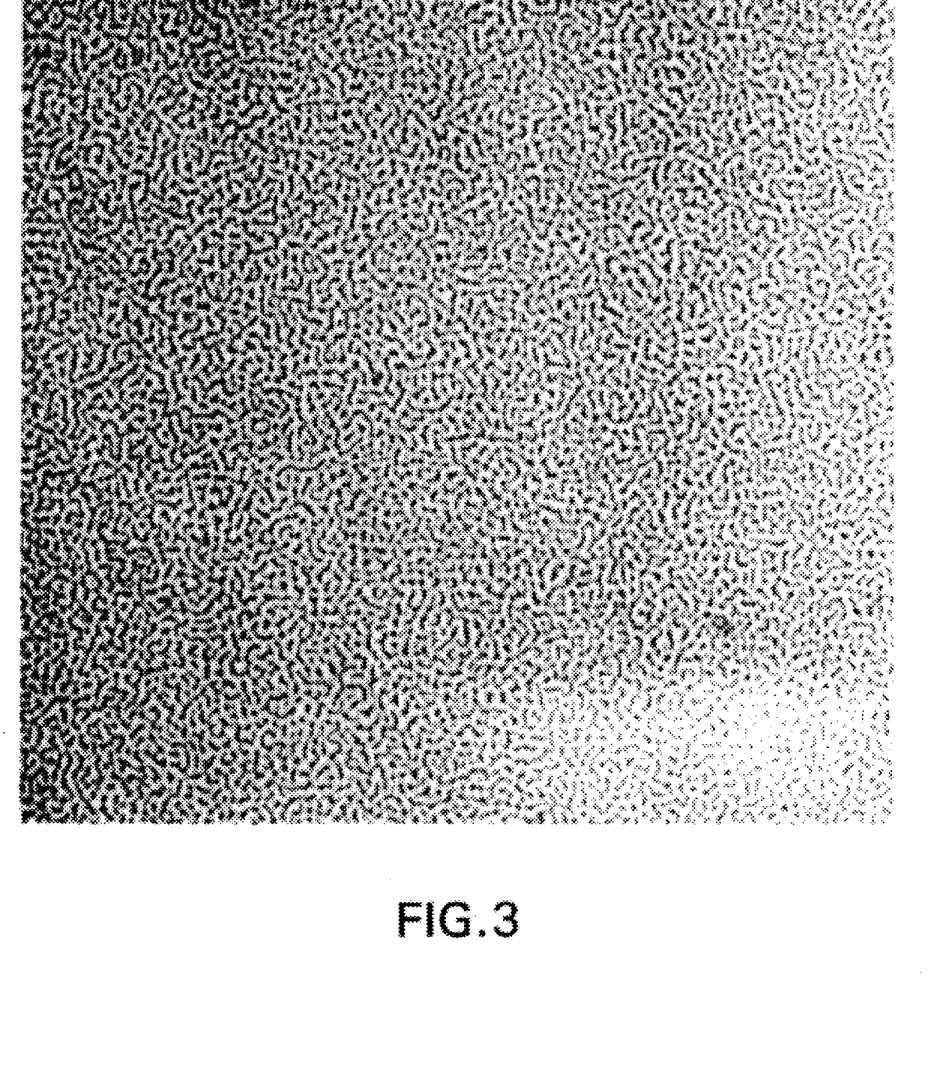
FIG. 3 is an image of a thresholded binary plane magnified 32 times and generated by thresholding the screening mask of FIG. 2 at 50% of the maximum tone value.

A further criteria of an embodiment of the invention is to require that for each of the thresholded binary planes at every predetermined optical density level, the binary plane in the frequency domain should substantially fall within a spread spectrum of frequencies. It is often not enough to merely require that the mask itself have the desired frequency domain characteristics. The thresholded binary planes should also be controlled to fall within a frequency band. The binary plane at an optical density level is transformed into the frequency domain by performing a Fourier transform. A fast Fourier transform program may be used to produce an adequate representation of the frequency domain for any given binary plane. The present system takes advantage of a fast Fourier transform anytime a Fourier transform is called for. An image corresponding to a binary plane has been printed in FIG. 3. FIG. 3 is a magnified view 32 times the original binary plane representing an optical density level of 50% of the maximum level. The actual printed plane would appear to the human eye as a uniform tone at an ordinary viewing distance. The 1's and 0's of the binary planes have been printed such that one of the binary values is black and the other is white.

Figure 4:
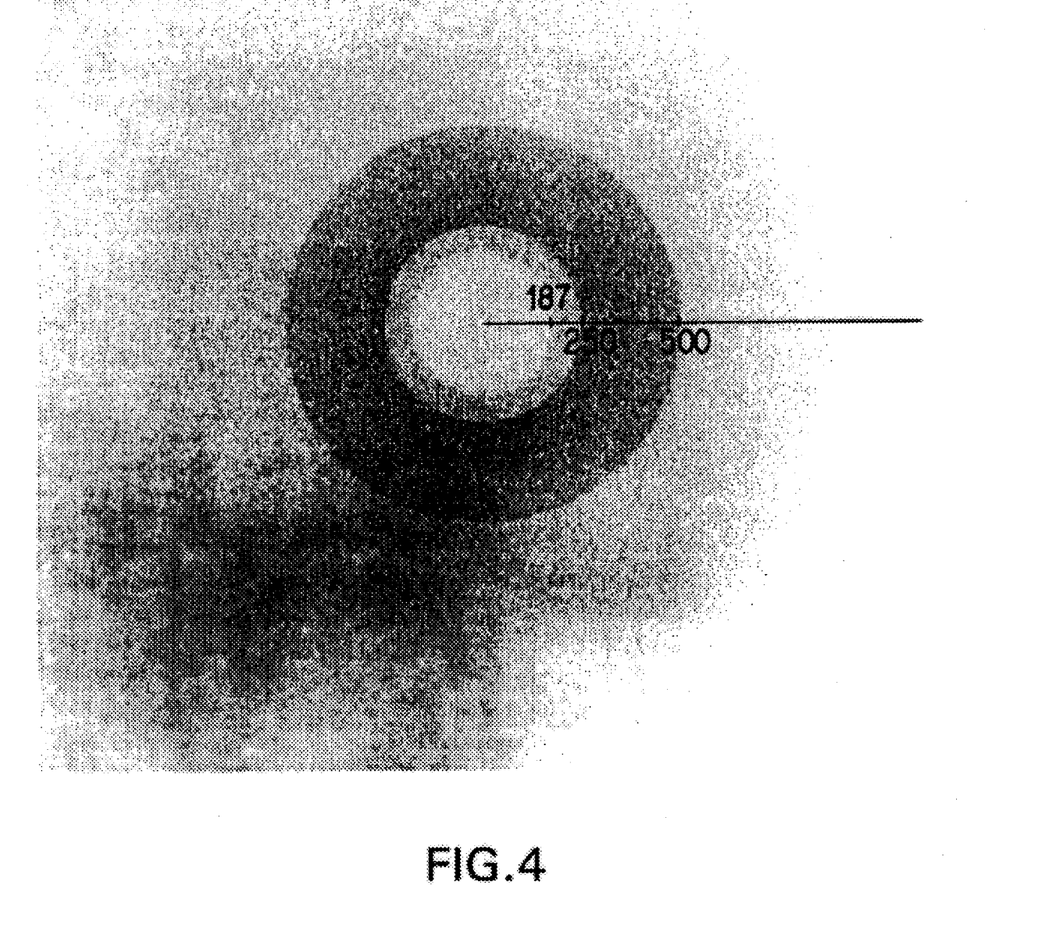
FIG. 4 is a plot in the frequency domain of the binary plane of FIG. 3.

Performing a fast Fourier transform on the binary plane of FIG. 3 results in the graphic depiction in the frequency domain of FIG. 4. Magnitude is illustrated in the graph by the intensity of black. Full black is set to the maximum magnitude in the graph. However, a notch has been taken out of the frequency domain at the very lowest frequencies to eliminate the steady state level which predominates over the uniform visible tone. A distinct band of uniform magnitude appears in the frequency domain. The band is the same frequency band as was characteristic of the frequency domain for the screening mask itself. High order harmonics produce some signal magnitude outside of the frequency band, however it is relatively insignificant. Likewise, the frequency content below the minimum frequency of the band is relatively insignificant compared to the magnitude of the signal within the spread spectrum band. Within the relatively insignificant low frequency area, the magnitudes are particularly eliminated below a cutoff frequency of 200 dots per inch. Within the band, the magnitude is relatively uniform over all angles from 0°–360°. In the embodiment shown, the magnitude represents a step function. However, other functions may be used to characterize the magnitudes of the signal within the band of frequency components.

Figure 5:
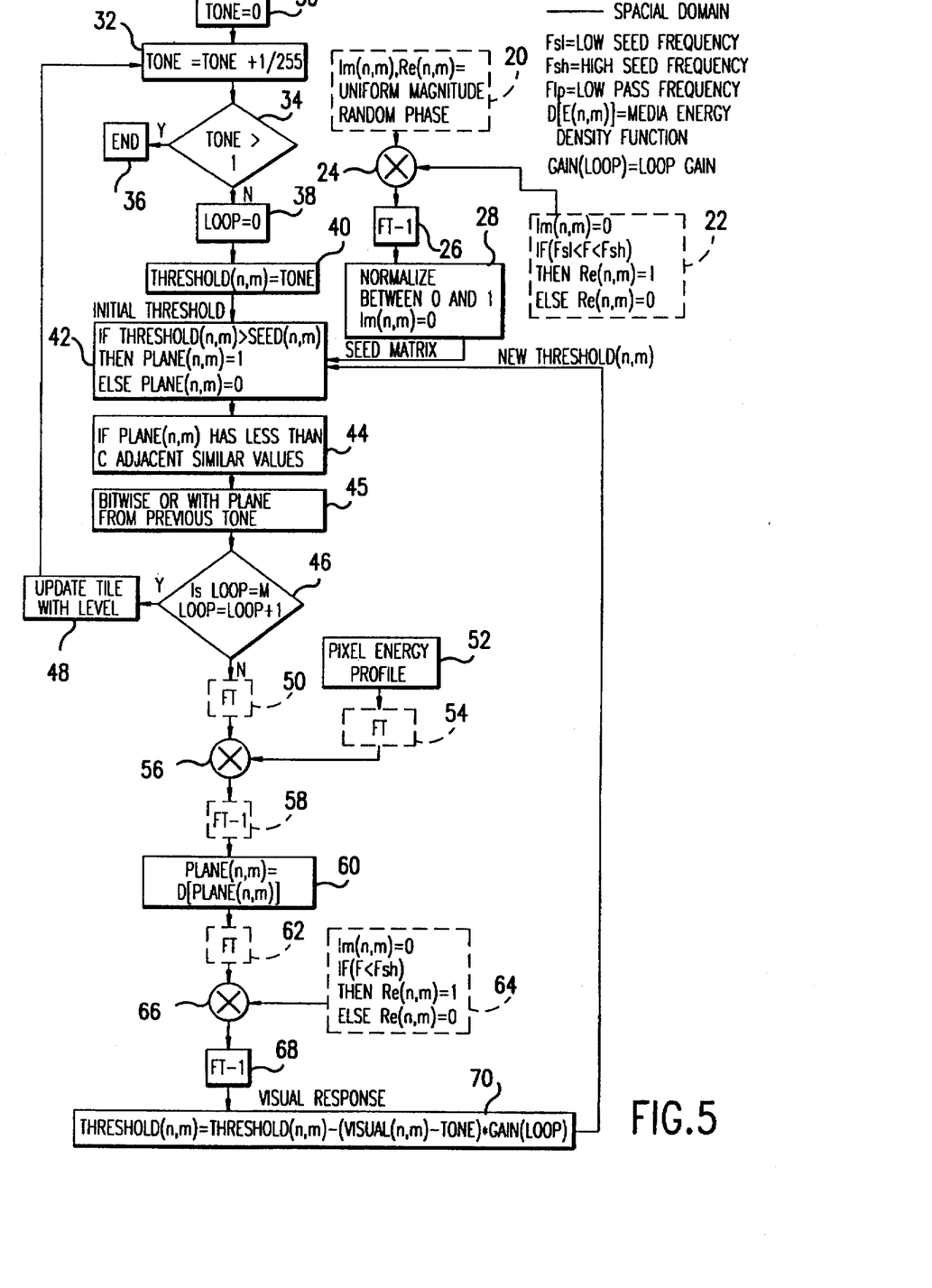
FIG. 5 is a schematic representation of logical flow for generating the spread spectrum screening mask of FIG. 2.

Referring now to FIG. 5, one method for generating a spread spectrum mask in accordance with an embodiment of the invention shall be described. The first steps involve creating a seed matrix. In the present embodiment, this is performed in the frequency domain. A matrix of uniform magnitude and random phase is generated in step 20, the matrix is bandpass filtered in steps 22 and 24. The desired frequency band is set by step 22. All frequencies within the band of the spread spectrum screening mask are set to 1 while all remaining areas of the matrix are equal to 0. The function generated in step 22 acts as a digital band pass filter when multiplied in step 24 with the matrix from step 20. Thus a function is obtained that has components solely within the desired frequency band that are uniform in magnitude and random in phase. An inverse Fourier transform is performed in step 26 to obtain a matrix in the spatial domain. The magnitudes in the spatial domain are normalized so that they all fall between 0 and 1 in step 28. Any imaginary components I(n,m) are set to zero.

While the spread spectrum mask generated in step 28 is restricted in the frequency domain to within the spread spectrum band of frequencies and is uniform in magnitude therein, the thresholded binary planes generated by the mask will likely include an abundance of unwanted magnitude within the low frequencies. To eliminate this unwanted low frequency content among the binary planes, the spread spectrum mask is further processed and refined. The binary planes are generated one at a time beginning at the lowest level. The tone or optical density level is initialized at 0 in step 30. The tone (optical density level) is incremented in step 32. Steps 34 and 36 end the program once all of the optical density levels have been processed. The thresholds of the resulting spread spectrum mask are determined moving up the binary planes from the lowest to the highest optical density level at each pixel and identifying the optical density level where the binary value of the pixel changes between a 0 and a 1.

A processing loop counter is set to 0 at step 38. A threshold value is set in floating point equal to the tone value in step 40. The threshold value is then compared at each pixel of the seed matrix to produce a bit plane of 1's and 0's in step 42. The clustering of pixels requirement is added in step 44. Each pixel with less than two similarly valued adjoining pixels is changed in value. In evaluating neighboring pixels for pixels on an edge of the binary plane, the algorithm wraps around the plane to the opposite edge. This is consistent with the desire for a seamless mask that can be contiguously repeated across an image without border effects. Isolated 1's are thus replaced with an opposite value. This step may temporarily throw off the required relative number of 1's and 0's in the binary map but maintains the requirement of clustered pixels. The totals will be corrected in subsequent iterations of the processing loop.

Slight variations in tone from one optical density value to the next should not be accompanied by noticeable shifts in pixel locations. To maintain a continuity from one binary plane to the next, at step 45 the binary plane is ORed with the binary plane previously completed for the next lower tone value. In this step, each pixel value is ORed with a correspondingly located pixel value. Thus, for any pixel once it has been set to 1 in a binary plane, it will remain 1 for all binary planes above that plane. Thus, the spread spectrum mask will have a single optical density threshold value at each pixel where the pixel value changes from 0 to 1.

The processing loop for refining the binary plane is repeated a fixed number of times. It has been found that setting this number to 50 is adequate to obtain a spread spectrum screening mask which meets the requirements of the invention. The loop counter is incremented in step 46. If the processing loop has completed the predetermined number of cycles, the binary plane is finished and stored in step 48. The program then proceeds with generating the next level of binary plane. In step 50, a Fourier transform is performed on the binary plane to put it into frequency domain. A fast Fourier transform is adequate.

The processing loop proceeds to determine what the binary plane will look like when printed. The pixel energy profile 52 is the spatial distribution of a pixel when plotted on film using a particular plotter. The Optronics Colorsetter plotter shines a laser on each pixel having a 1 value. The image created on the film by one laser dot is circular and darkest in the middle. The pixel energy profile 52 is more particularly identified as being a circular Gaussian distribution. The pixel energy profile 52 should be selected for the particular plotter for which the spread spectrum mask will be used. The profile is converted to frequency domain by a fast Fourier transform in step 54. It is multiplied by the binary plane in step 56 and the result is inverse Fourier transformed to obtain a spatial map of the film that would be generated by the binary plane.

In step 60, the media energy density function is applied to the film map. The media energy density function relates the ability of a printing press to reproduce the film. Thus, step 60 converts the map to characterize what the printing press will produce.

The resulting map is transformed again into the frequency domain by a Fourier transform in step 62. In steps 64 and 66, the bit plane is low pass filtered to eliminate high frequencies which are not visually perceived. Step 64 creates a circle in the frequency domain in which all frequency values above the visual low pass frequency are set equal to 0 while the values within the circle are set equal to 1. The presently used low pass frequency is 187 dots per inch. This circle is multiplied by the frequency domain obtained from step 62. The result is inverse Fourier transformed in step 68 to obtain the visual response that will be obtained upon viewing the printed binary plane. The desired visual response is for every pixel to be equal to the tone of the binary plane. The processing loop is repeated a number of times to progressively modify the binary plane to get the visual response closer to the desired uniform tone.

A correction factor is subtracted from the threshold array to rerun the processing loop. The threshold array is updated at each pixel in accordance with step 70. The desired tone is subtracted from each value of the visual response and the result is multiplied by a predetermined gain. The gain is predetermined for each iteration of the loop. The present embodiment uses a constant gain of 0.1. However, the gain number may be set as a function of the loop iteration. Thus, the gain could be made smaller as the number of loop iterations increases so that the modifications to the binary plane become progressively smaller. The product of the gain times the visual response minus the tone is subtracted from the existing threshold array. The new threshold array is then used to repeat the loop. The new threshold array is applied in step 42 to the seed matrix to obtain a new binary plane.

Figure 6:
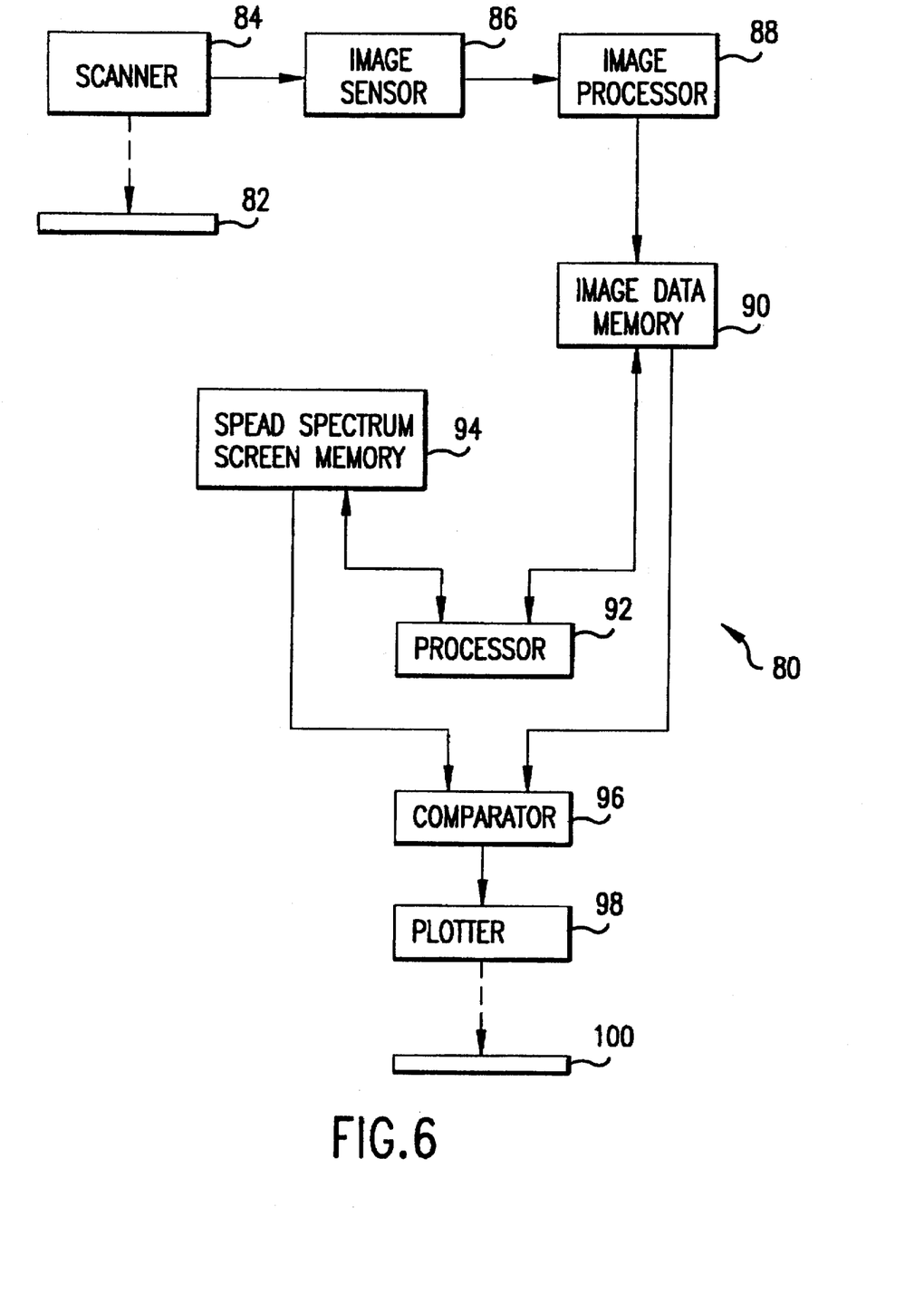
FIG. 6 is a block diagram of a plotter loaded with the spread spectrum screening mask of FIG. 2.

Referring now to FIG. 6, there is shown a system 80 for reproducing an image 82 using the spread spectrum digital screening of the invention. The system 80 includes a scanner 84 which optically scans an image 82 and generates image signals that are sensed by an image sensor 86. The image signals are processed in a processor 88 to produce optical density value arrays for each of the basic colors. The image data thus obtained is stored in a memory 90. The plotting of the image is performed under the command of a processor 92. As such, optical density image signals representing variations in optical density of image 82 taken from image data memory 90 and optical density threshold values from the spread spectrum screen memory 94 are compared in a comparator 96. The process described with respect to FIG. 1 is generally followed. The output of the comparator controls the laser output of a plotter 98 to reproduce the halftone image on a film 100. To generate four halftone screens for each of the basic colors, the screens can be plotted on four separate areas of one film. Alternatively, each of the halftone screens may be plotted in each of four plotting operations. The image thus produced in accordance with the present embodiment of the invention exhibits exceptionally pleasing results. Low frequency effects such as Moire are barely visible.

For a color image reproduction, image tone values are provided for at least three basic colors. Preferably, in addition to cyan, yellow and magenta, tonal values are provided for black as well. A scanner obtains a digital value for each pixel of a continuous tone image to be reproduced. The digital value is converted into the tonal values for the basic colors. Cyan, magenta and yellow are orthogonal to one another and are thus unlikely to create a problem when superimposed. Black, on the other hand, is subject to creating Moire effects with the other colors. Each basic color is handled separately by the plotter. It is important to avoid Moire effects as between the various colors. In order to assist in avoiding such effects, the spread spectrum mask for each color is made a different size. In a present embodiment, the black mask is 512×512, the magenta mask is 504×504, the cyan mask is 496×496, and the yellow is 488×488 pixels. To the extent that any pattern is created between the colors using this system, it would extend over such a large area that it would not interfere with the visualization of the desired image.

An image produced by the spread spectrum mask will exhibit the spread spectrum band in a frequency domain plot of the image or a portion of the image. The actual visible image information will appear generally below 50 dots per inch. The visual image information may be filtered out so that the halftone screening information can be revealed. The spread spectrum mask advantageously produces image reproductions which remain true to the original continuous tone image and which substantially minimize or reduce any Moire effects.

Of course it should be understood that various changes and modifications to the preferred embodiments described above will be apparent to those skilled in the art. For example, the spread spectrum band may be characterized in magnitude with a Gaussian function or trapezoidal function or multiple step function instead of the single step function described herein. Also, rather than using screening masks of different size, Moire effects between various colors may be avoided by screening the mask at different angles for each color. These and other changes can be made without departing from the spirit and scope of the invention and without diminishing its attendant advantages. It is therefore intended that such changes and modifications be covered by the following claims.

I claim:

1. A digital screening mask comprising:

a computer readable memory for storing data, wherein stored in the memory is a two dimensional array of optical density threshold values, each value being in a range between a minimum value and a maximum value, wherein a frequency domain plot of said array of threshold values is characterized by a function in magnitude independent of angle within a band of frequencies between a minimum frequency and a maximum frequency, the minimum frequency normally being imperceptible to humans and the maximum frequency being a frequency within the ability of a printing press to print.

2. The mask of claim 1 wherein the frequency domain plot of the two dimensional array is further characterized by a low cutoff frequency below which the magnitude is relatively insignificant and a high cutoff frequency above which the magnitude is relatively insignificant.

3. The mask of claim 2 wherein the low cutoff frequency equals the minimum frequency.

4. The mask of claim 3 wherein the high cutoff frequency equals the maximum frequency.

5. The mask of claim 1 wherein the two dimensional array is further characterized by a plurality of binary planes each characterized in the frequency domain by magnitudes primarily within a band of frequencies between the minimum frequency and the maximum frequency wherein each binary plane comprises binary values determined by a comparison between the threshold value of each pixel in the array and one of a plurality of predetermined threshold values.

6. The mask of claim 5 wherein said plurality of binary planes correspond to each of at least 255 predetermined threshold values.

7. The mask of claim 5 wherein for any of the binary planes the number of pixels having one of the binary values divided by a total number of pixels in the plane approximately equals a fraction determined by the predetermined threshold value divided by the maximum value.

8. The mask of claim 5 wherein each pixel in each of said binary planes has at least two contiguous pixels having the same binary value.

9. The mask of claim 5 wherein the frequency domain plot of each binary plane is independent of angle.

10. The mask of claim 5 wherein the frequency domain plot of each binary plane is uniform in magnitude between the minimum frequency and the maximum frequency.

11. The mask of claim 5 wherein the frequency domain plot of each binary plane is relatively insignificant in magnitude below a cutoff frequency and above the steady state image frequency.

12. The mask of claim 1 wherein the function is a constant in magnitude between the minimum frequency and the maximum frequency.

13. A method of digitally reproducing an image comprising:

scanning the image to produce a pixel-by-pixel digitization of color;

determining a two dimensional array of optical density values from the digitized scanned image;

comparing each pixel of the two dimensional array with a correspondingly located pixel in a screening mask according to claim 1; and generating a binary value for each comparison in response to whether or not the value of the pixel from the two dimensional array exceeds the optical density threshold value of the screening mask pixel.

14. A method of reproducing a multicolor image as a series of adjacent pixels comprising:

scanning the image to produce a pixel-by-pixel digitization of color;

determining a two dimensional array of optical density values from the digitized scanned image for each of a plurality of predetermined base colors;

comparing each pixel in each of the two dimensional arrays with a correspondingly located pixel in a screening mask according to claim 1; and generating a binary value for each comparison in response to whether or not the optical density value of the pixel in the two dimensional array exceeds the optical density threshold value in the screening mask pixel.

15. The method of claim 14 wherein a different screening mask is used for each of said base colors.

16. The method of claim 15 wherein the screening mask for each base color is a different sized two dimensional array.

17. A system for digitally screening an image comprising:

means for providing a two dimensional array of optical density values representative of the image;

memory means containing a screening mask in accordance with claim 1; and comparator means for comparing each pixel in the image array with a correspondingly located pixel in the screening mask and generating a binary signal for each comparison in response to whether or not the optical density value of the pixel from the two dimensional array exceeds the optical density threshold value of the screening mask pixel.

18. A binary reproduction of a continuous tone image comprising:

a substrate bearing a visible image characterized in the frequency domain by frequencies below 50 dots per inch, said image formed by a matrix of dots wherein the matrix of dots is characterized in the frequency domain by a function between a minimum frequency and a maximum frequency that is uniform with respect to angle, the minimum frequency being normally imperceptible to a human viewing the visible image and the maximum frequency being a frequency within the ability of a printing press to print.

19. The binary reproduction of claim 18 wherein the function characterizing the matrix of dots in the frequency domain is a step function.

* * * * *

US005689623C1

(12) EX PARTE REEXAMINATION CERTIFICATE (9768th)
United States Patent
Pinard (10) Number: US 5,689,623 C1
(45) Certificate Issued: Jul. 26, 2013

(54) SPREAD SPECTRUM DIGITAL SCREENING

(75) Inventor: Adam I. Pinard, Amherst, NH (US)

(73) Assignee: ECRM Incorporated, Tewksbury, MA (US)

Reexamination Request:
No. 90/011,392, Dec. 16, 2010

Reexamination Certificate for:
Patent No.: 5,689,623
Issued: Nov. 18, 1997
Appl. No.: 08/410,785
Filed: Mar. 27, 1995

(51) Int. Cl.
*H04N 1/405* (2006.01)
(52) U.S. Cl.
USPC ............. 358/1.6; 358/1.9; 358/3.13; 358/3.2; 358/465; 358/466; 358/536
(58) Field of Classification Search
None
See application file for complete search history.

(56) References Cited

To view the complete listing of prior art documents cited during the proceeding for Reexamination Control Number 90/011,392, please refer to the USPTO's public Patent Application Information Retrieval (PAIR) system under the Display References tab.

*Primary Examiner* — Majid A. Banankhah (57) ABSTRACT

A spread spectrum digital screening mask and a method and system for digital screening a continuous tone image with the spread spectrum digital screening mask. The mask is characterized in the frequency domain by a function in magnitude independent of angle within a band of frequencies between a minimum frequency and a maximum frequency. The mask may be further characterized by its thresholded binary planes at each of a plurality of predetermined threshold values. The binary planes are characterized in frequency domain by magnitudes primarily distributed within the band of frequencies. For each binary plane, the number of pixels having one of the binary values divided by the total number of pixels in the binary plane equals a fraction determined by the predetermined threshold value of the binary plane divided by the maximum threshold value.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-19 are cancelled.

\* \* \* \* \*